Dec. 22, 1953    R. P. HORAN    2,663,195
BELT TENSIONER
Filed June 20, 1950    2 Sheets-Sheet 1
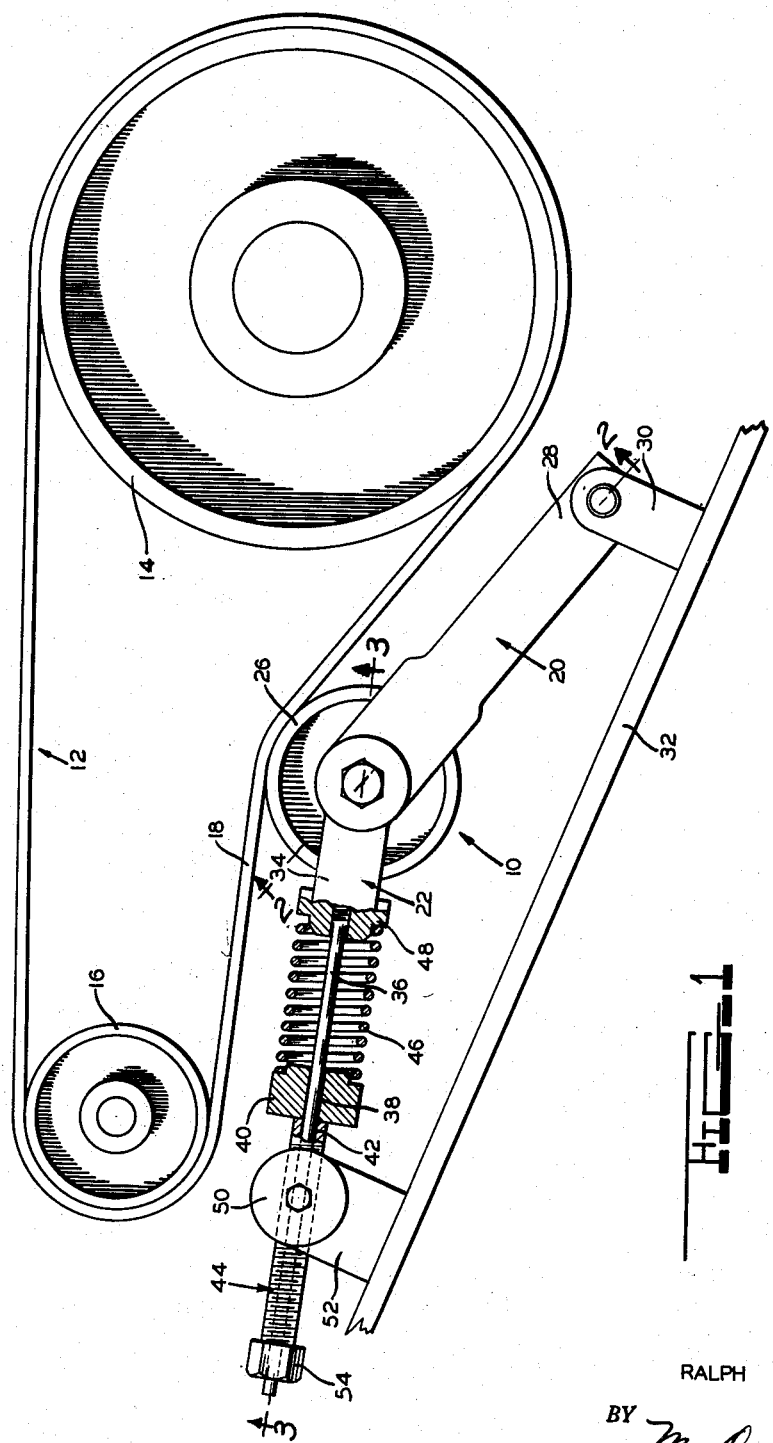
INVENTOR.
RALPH P. HORAN
BY *McDonald & Teagno*
ATTORNEYS Dec. 22, 1953  R. P. HORAN  2,663,195
BELT TENSIONER
Filed June 20, 1950  2 Sheets-Sheet 2
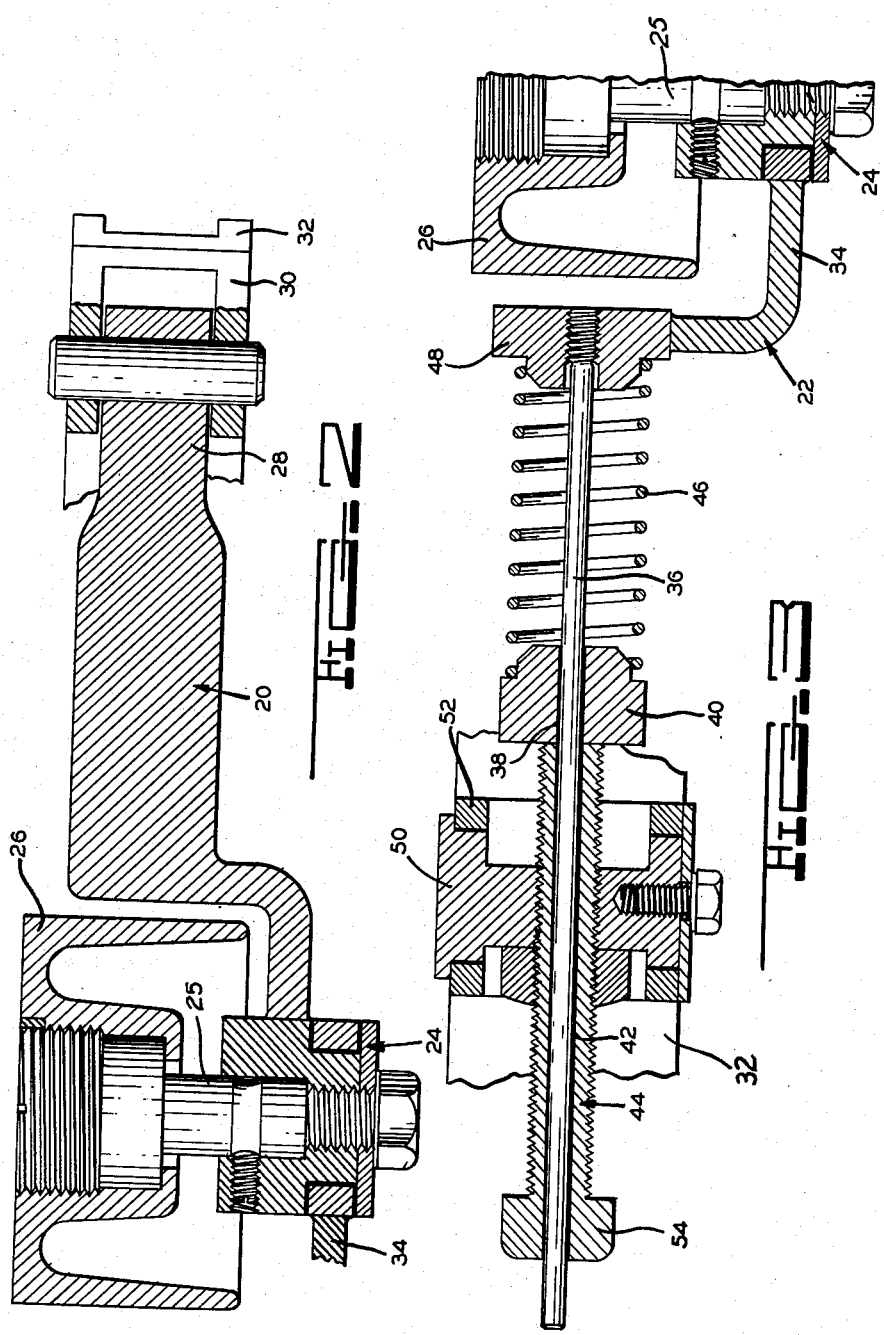
INVENTOR.
RALPH P. HORAN
BY
ATTORNEYS Patented Dec. 22, 1953

2,663,195

UNITED STATES PATENT OFFICE 2,663,195

BELT TENSIONER

Ralph P. Horan, Detroit, Mich., assignor to Eaton Manufacturing Company, Cleveland, Ohio, a corporation of Ohio Application June 20, 1950, Serial No. 169,203

10 Claims. (Cl. 74—242.11)

This invention relates to the tensioning of pulley driven belts and more particularly to mechanism for essentially maintaining a constant belt tension for a given range of tension pulley positions.

Broadly the invention comprehends the provision of a belt tensioning mechanism comprising a linkage arrangement wherein the geometric relationship of the links is such, together with the constant loading of one of the links effective to maintain a constant belt tension and a constant maximum driving torque capacity when the belt length changes.

Although numerous belt tensioning devices have been devised, none have achieved the desirable results attained by the presently devised mechanism through the provision of a specific geometric relationship of a two arm linkage mechanism wherein the link arms are arranged to remain substantially parallel to the slack side of the belt with one arm having a fixed length and pivot axis and the other arm being loaded by an external source to exert a constant force parallel to the arm over a range of belt deflections.

Among the several objects of the invention is the provision of a belt tensioning mechanism that occupies a minimum of space; that is, provided with ample friction in its bearings to overcome any tendency toward the vibration thereof due to belt flap at high speeds; and, that is capable of maintaining a constant belt tension and a constant maximum driving torque capacity.

Other objects and advantages of the invention will appear from the following description taken in connection with the drawings, forming a part of the specification; and in which, Fig. 1 is a side elevation view of a belt tensioning mechanism, constituting the invention, partly in section as applied to a pulley driven belt arrangement;

Fig. 2 is an enlarged vertical cross-sectional view taken substantially along lines 2—2 of Fig. 1; and Fig. 3 is an enlarged vertical cross-sectional view taken substantially along lines 3—3 of Fig. 1.

This belt tensioning mechanism was devised for the purpose of providing a simple linkage arrangement which was effective to achieve the desirable condition of constant belt tension or constant maximum driving torque capacity of a pulley driven belt. The linkage arrangement comprises two link arms, one of which is fixed as to length and pivot axis whereas the other link arm which is freely pivoted at the free end of the first link arm having a tensioning pulley upon the joint pivot thereof is extensible in length and movable upon a fixed pivot axis. The extensible link arm is loaded so as to exert a constant force parallel to the arm over a range of belt deflections. The link arms are so positioned to one another and the pulley driven belt to which applied and made of predetermined arm length such that they are maintained substantially parallel to the slack side of the belt thereby providing a geometric arrangement which together with the loading of the extensible link arm provides for the substantially constant maximum driving torque capacity of the mechanism.

By providing a desirable friction in the bearings for the mechanism it is possible to overcome any tendency toward vibration of the mechanism due to belt flap at high speeds.

Referring to the drawings for more specific details of the invention 10 represents a belt tensioning mechanism as applied to a pulley driven belt arrangement 12.

The pulley driven belt arrangement comprises a driving pulley 14, a driven pulley 16 of smaller diameter than pulley 14 and an endless belt 18 driven about the pulleys for the transmission of rotation therebetween.

The belt tensioning mechanism 10 which is applied to the belt 18 so as to maintain a constant tension thereon comprises two link arms 20 and 22 freely pivoted together at 24 and supporting upon the pivot shaft 25 thereof a tensioning pulley 26 adapted to have bearing engagement upon the external surfaces of the belt on the clock side thereof as viewed in Fig. 1.

The link arm 20 is pivoted at end 28 thereof upon a bearing yoke 30 which is, in turn, suitably fixedly secured upon a stationary plate 32. Link arm 22 is in two parts, part 34 pivoted on shaft 25 and an extended rod 36 integrally connected with part 34. The rod 36 is received in a bore 38 of a spring retainer 40 and a bore 42 of a bolt 44 for free axial movement thereto with a compression coil spring 46 arranged intermediate a hub portion 48 of link arm part 34 and spring retainer 40 in telescoping relation about rod 36. The bolt 44 is, in turn, threadingly secured in an adjustable pivot shaft 50 with one end abutting the axial extremity of spring retainer 40 opposite from the spring bearing point thereon. The pivot shaft 50 is mounted in a bearing yoke 52 which like bearing yoke 30 is suitably secured upon plate 32.

It will be observed in viewing Fig. 1 that the bearing yokes 30 and 52 are so arranged as to lie substantially in a line intercepting the belt tangent and center of each pulley, with the belt in straight line connection between the pulleys on the slack side thereof. Slight variation from the true positioning thereof is necessary to eliminate any possibility of interference of the link arms with the belt as the link arms are pivoted and the tensioning pulley moved to maintain constant tension on the belt as well as to account for a shifting of the line intercepting the pulley center and tangent point of the belt as the belt slackens. By so arranging the pivot axes for the link arms in close proximity to the belt and proportioning the link arms, the arms are made to lie substantially parallel to the slack side of the belt for a range of belt deflections.

The spring 46 in its position between the link arm 22 and spring retainer positioned by the bolt 44 is free to exert a constant load on the arm along the axis thereof, the component force of which is applied by tensioning pulley 26 to the belt such that because of the reaction of the belt being equal and opposite to the force of the pulley 26 applied to the belt and the parallel arrangement of the link arms, the tension in the slack side of the belt will be an equal and opposite force to the constant load applied by spring 46.

Under conditions wherein it is conceivable that the stretch of the belt might change its length when the driving pulley is varied between high and low ranges of speed, the tensioning mechanism is operable to maintain a substantially constant driving torque capacity even though the length of the arm 22 from its pivot point varies slightly.

The rod 36, as shown by Fig. 1, is initially set for one belt length or tensioning position wherein it extends a predetermined distance beyond the nut end 54 of the bolt so that if or as the belt lengthens beyond this predetermined movement of the rod relative to the bolt when the rod disappears into the bolt at the nut end thereof, a readjustment of the rod and bolt for the proper compression height of the spring can be made so that a desired constant force of the spring can be exerted and a substantially constant tension of the belt can be maintained.

The belt tensioning mechanism is effective to provide for a substantially constant tensioning of the belt or constant maximum driving torque capacity over a considerable range of belt length change even taking into account that as the belt lengthens, the wrap around on the small pulley increases such that even if a slightly greater load might be required when the belt has lengthened an appreciable amount if all other conditions remained the same, the wrap around on the small pulley compensates for the load difference thereby not requiring the load difference to maintain the constant tension desired.

By so arranging the link arms in close parallel proximity to the slack side of the belt the space occupied thereby is a minimum and so adapts the belt tensioning mechanism advantageously to engine driven accessories such as superchargers, compressors and the like where space is usually limited.

The link arms in their bearing relation to one another and the bearing yokes with which they are respectively associated have sufficient frictional resistance imposed thereon to their free movement effective to overcome any tendency toward the vibration thereof due to belt flap at high speeds.

Although the belt tensioning mechanism as here disclosed is directed specifically to the provision of a coil spring for applying the constant load for the proper controlled operation thereof, it is conceivable that any of several loading mediums such as hydraulic fluid or the like under pressure could equally as well be utilized, and further even though the mechanism is shown in one illustrated application, it is susceptible of numerous changes in structural embodiment and application as will readily appear to those skilled in the art. The invention is, therefore, limited only as indicated by the scope of the appended claims.

What I claim is:

1. In a belt tensioning mechanism, an arm having a fixed pivot axis, a second arm freely pivoted at the free end of the first arm, an idler pulley pivoted at the pivot connection of the arms, and constant load maintainable means exerted on the second arm parallel thereto said arms being arranged and maintained substantially parallel to the slack side of the belt which the mechanism is adapted to tension with the pulley in engagement with the belt at its external periphery on the slack side thereof.

2. A belt tensioning mechanism according to claim 1 wherein the second arm is pivoted on and axially movable relatively to a fixed bearing pivot therefor.

3. A mechanism according to claim 1 wherein the constant load maintainable means is an adjustable height coil spring.

4. A mechanism according to claim 2 wherein the pivot axis of the first arm and bearing pivot for the second arm lie substantially respectively in lines passing through the axis of the driving and driven pulleys of a belt drive arrangement and the normal tangent of the belt to the pulleys and wherein the arms are arranged parallel to the slack side of the belt which the idler pulley engages externally of the belt.

5. A mechanism according to claim 1 wherein the second arm is axially slidable in a fixed pivot post and is axially resiliently biased away from the post by a coil spring, inserted between the post and arm, exerting a constant load thereon.

6. A mechanism according to claim 5 wherein adjustment means are provided for setting the spring to a desired compression height.

7. A mechanism according to claim 6 wherein means are provided for observing the axial movement of the second arm relative to the spring adjustment means.

8. A mechanism according to claim 1 wherein the second arm is axially movable in an adjustment bolt threaded in a fixed pivot post and a constant load coil spring is arranged intermediate a portion of the bolt and second arm biasing the bolt and second arm axially apart.

9. A mechanism according to claim 8 wherein the free end of the second arm extends axially beyond the bolt a predetermined distance.

10. In a belt tensioning mechanism, an arm having a fixed pivot axis, a second arm freely pivotal at the free end of the first arm, a pivotal fixed axis bearing support for the second arm, an idler pulley pivotal at the pivot connection of the arms, and constant load maintainable means exerted on the second arm, said arms being arranged and maintainable substantially parallel to the slack side of a belt which the mechanism is adapted to tension with the pulley in engagement with the belt at its external periphery on the slack side thereof and wherein the arms are in line with one another and they lie parallel to a portion of the belt to be tensioned when there is no slack therein.

RALPH P. HORAN.

References Cited in the file of this patent

UNITED STATES PATENTS

| Number | Name | Date |
|---|---|---|
| 598,658 | Gilman | Feb. 8, 1898 |
| 2,310,081 | Hill | Feb. 2, 1943 |

FOREIGN PATENTS

| Number | Country | Date |
|---|---|---|
| 24,062 | France | Feb. 21, 1922 |
| 522,931 | France | Apr. 8, 1921 |